TRANSISTORIZED DEFLECTION CIRCUIT WITH SELECTIVE FEEDBACK

Filed April 18, 1961 2 Sheets-Sheet 1

INVENTOR.
EDWIN A. PASCHAL,
BY Robert H. Himes
ATTORNEY.

Nov. 3, 1964 E. A. PASCHAL 3,155,873

TRANSISTORIZED DEFLECTION CIRCUIT WITH SELECTIVE FEEDBACK

Filed April 18, 1961 2 Sheets-Sheet 2

INVENTOR.
EDWIN A. PASCHAL,
BY Robert H. Hines
ATTORNEY.

United States Patent Office 3,155,873
Patented Nov. 3, 1964

3,155,873
TRANSISTORIZED DEFLECTION CIRCUIT WITH SELECTIVE FEEDBACK

Edwin A. Paschal, Anaheim, Calif., assignor to Hughes Aircraft Company, Culver City, Calif., a corporation of Delaware Filed Apr. 18, 1961, Ser. No. 103,822
5 Claims. (Cl. 315—27)

Figure 1:
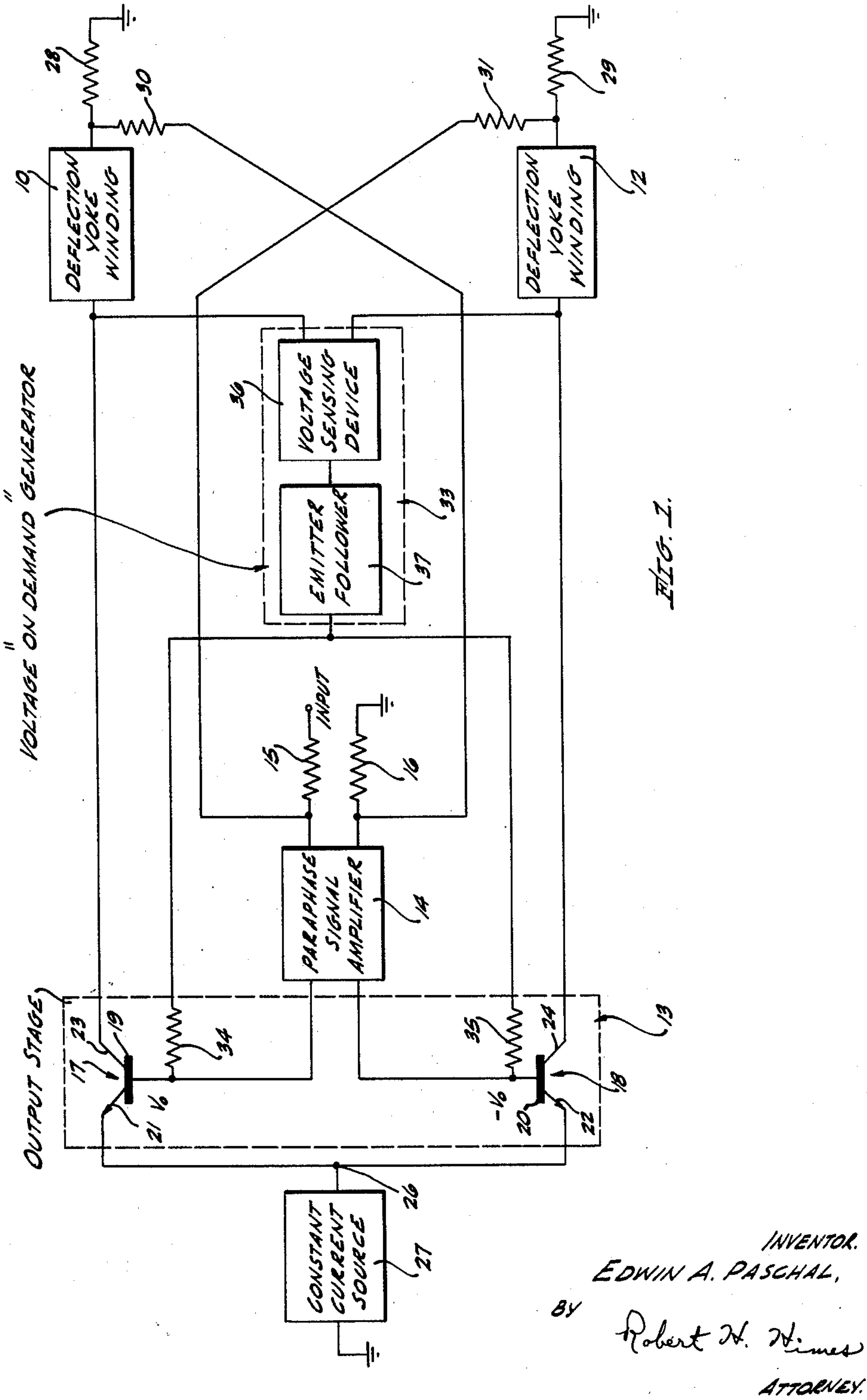

This invention relates to an apparatus for magnetically deflecting the electron beam of a cathode-ray type tube at high speed and more particularly to an apparatus including a transistorized amplifier including a transistor output stage adapted to handle substantial currents with minimum power dissipation.

In a typical deflection apparatus, it is generally necessary that currents flowing through the yoke winding for deflecting an electron beam reach a quiescent state following a change in an interval of time equal to 12 microseconds or less. This, in turn, necessitates that the current be charged into the yoke winding in 10 microseconds or less. In circuits of this type a typical yoke winding characteristically has inductances of the order of microhenries and requires of the order of 12 amperes for full deflection on a 70° cathode-ray tube. If a "step" input signal is employed, it may be shown that a voltage of the order of 36 volts is required to charge 12 amperes into a 30 microhenry yoke winding in 10 microseconds. Thus, an output stage capable of handling 12 amperes and maintaining 36 volts across each yoke winding is necessary to meet the aforementioned typical requirements by conventional techniques. In addition, it is necessary that the transistor of each output stage be capable of dissipating 12×36 or 432 watts which is a very difficult requirement in that this energy is dissipated continuously except during transient periods of operation.

It is therefore an object of the present invention to provide an improved high-speed magnetic deflection system.

Another object of the present invention is to provide a magnetic deflection system incorporating a transistor output stage with minimum power dissipation therein.

Still another object of the present invention is to provide a magnetic deflection system incorporating a non-dissipative auxiliary device to provide peak transient energy requirements.

A further object of the present invention is to provide a deflection system incorporating a transistor output stage adapted to apply high voltage across the yoke windings during transient periods without requiring comparable energy dissipation in the output transistors during quiescent conditions.

A magnetic deflection apparatus in accordance with the present invention includes a paraphase input stage which excites a push-pull output stage that includes a non-dissipative current source. In operation, an input signal for controlling the deflection is converted to a push-pull signal by the paraphase input stage and is, in turn, amplified by the push-pull output stage and used to control differential currents through double-ended deflection yoke windings, each of which have one extremity returned to ground through respective current sensing resistors. Current flow through the deflection yoke windings is sensed and fed back to the paraphase input stage in a degenerative manner thereby to provide a high degree of stability and to insure the differential character of the currents through the deflection yoke windings. Further, the push-pull output stage is poled in a manner such that the deflection yoke winding being turned on has maximum current flow therethrough and is the more negative of the two windings. Power dissipation in the transistors of the push-pull output stage is minimized by a "floating" source of current which is clamped to the more negative of the two deflection yoke windings and connected to control the voltage applied to the output transistors thereby to provide power to the transistors only on demand, i.e., only during transient periods.

Figure 2:
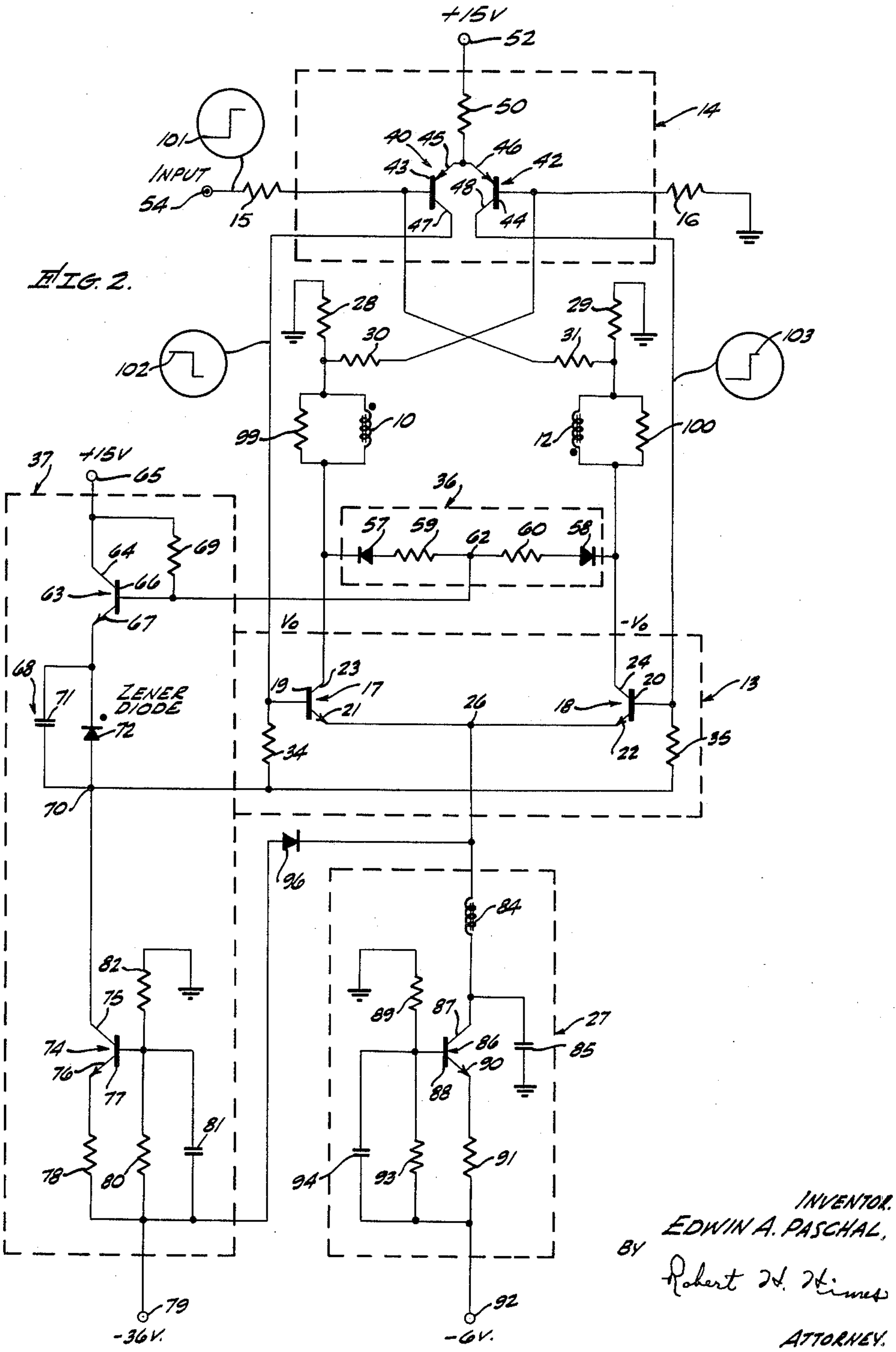

The above-mentioned and other features and objects of this invention and the manner of obtaining them will become more apparent by reference to the following description taken in conjunction with the accompanying drawings, wherein:

FIG. 1 shows a partial schematic flow diagram of a preferred embodiment of the present invention; and FIG. 2 illustrates a schematic circuit diagram of the apparatus of the present invention.

Referring now to FIG. 1 of the drawings, there is shown a schematic block diagram of the apparatus of the present invention for driving double-ended deflection yoke windings 10, 12. The deflection yoke windings 10, 12 are driven by a transistor output amplifier 13 which is excited by a paraphase signal amplifier 14 which, in turn, has inputs that are connected to an input terminal and to ground through summing resistors 15, 16, respectively. The transistor output amplifier 13 includes n-p-n type transistors 17, 18, which include bases 19, 20, emitters 21, 22 and collectors 23, 24, respectively. The bases 19, 20 of transistors 17, 18 are connected to the push-pull outputs of paraphase signal amplifier 14 and are responsive to deflection voltages $V_o$ and $-V_o$, respectively, which are 180° out of phase and which result from the output currents of paraphase amplifier 14. The emitters 21, 22, on the other hand, are connected to a common junction 26 which, in turn, receives current from a constant current source 27. The collectors 23, 24 of transistors 17, 18 are connected to one extremity of the deflection yoke windings 10, 12, respectively, and the remaining extremities thereof are connected through current sensing resistors 28, 29, respectively, to ground. In addition, feedback resistors 30, 31 are connected from the junction intermediate the deflection yoke windings 10, 12 and current sensing resistors 28, 29, respectively, to the inputs of the paraphase signal amplifier 14 in a manner to provide degenerative feedback and thus stabilize current flow through the deflection yoke windings 10, 12. Lastly, a voltage "on demand" generator 33 is responsive to the voltages appearing at the inputs of the deflection yoke windings 10, 12, i.e., at the collectors 23, 24 of transistors 17, 18 and has an output connected through resistors 34, 35 to the bases 19, 20, respectively, of the transistors 17, 18. The inputs to the voltage "on demand" generator 33 are connected to the inputs of a negative voltage sensing device 36 which develops an output voltage equal to the more negative voltage applied thereto. This more negative voltage is, in turn, transposed through an emitter-follower amplifier 37 to the resistors 34, 35. The function of the voltage "on demand" generator 33 is to minimize the voltage drops across the transistors 17, 18 during quiescent periods and, in particular, to maintain the voltage drop from the collectors 23, 24 to the bases 19, 20, respectively, at a minimum during quiescent periods as will be hereinafter explained.

Referring now to FIG. 2 of the drawings wherein like reference characters designate like elements, there is shown a more detailed schematic circuit diagram of the apparatus of FIG. 1. In particular, paraphase signal amplifier 14 includes p-n-p type transistors 40, 42 which have bases 43, 44, emitters 45, 46 and collectors 47, 48, respectively. The emitters 45, 46 of transistors 40, 42 are connected to a common junction which, in turn, is connected through a resistor 50 to a terminal 52 which is maintained at a potential of the order of +15 volts relative to ground. The bases 43, 44 are connected, respectively, through the resistor 15 to the input terminal to the paraphase amplifier 14 and through the resistor 16 to ground. In addition, bases 43, 44 are also connected, respectively, to feedback resistors 31, 30. Lastly, the collectors 47, 48 are connected to the bases 19, 20, respectively, of the output transistors 17, 18.

Secondly, the negative voltage sensing device 36 includes diodes 57, 58 connected from the collectors 23, 24, respectively, of transistors 17, 18 through resistors 59, 60 to an output junction 62. The diodes 57, 58 are poled in a direction to allow conventional current flow away from the output junction 62. The emitter follower 37 includes a transistor 63 having a collector 64 connected to a terminal 65 maintained at a potential of the order of +15 volts relative to ground, a base 66 connected directly to the output junction 62 of negative voltage sensing device 36 and, in addition, connected through a resistor 69 to the terminal 65, and an emitter 67 connected through a constant voltage dropping network 68 to an output terminal 70. The constant voltage dropping network 68 includes, for example, a capacitor 71 and a Zener diode 72 connected in parallel from emitter 67 to output terminal 70 with the Zener diode 72 poled as shown in the drawing. The output terminal 70 of emitter follower 37 constitutes the output of the voltage "on demand" generator 33 (FIG. 1) which, as previously specified, is connected through resistors 34, 35 to the bases 19, 20, respectively, of transistors 17, 18. In addition, emitter follower 37 includes an n-p-n type transistor 74 having a collector 75 connected to the output terminal 70, an emitter 76 connected through a resistor 78 to a terminal 79, the terminal 79 being maintained at a potential of the order of −36 volts relative to ground, and a base 77. A resistor 80 and a capacitor 81 are connected in parallel from the terminal 79 to the base 77 of transistor 74 and a resistor 82 is connected from the base 77 to ground.

Further, the constant current source 27 includes an inductor 84 and a capacitor 85 connected in series and in the order named from the junction 26 intermediate the emitters 21, 22 of transistors 17, 18 to ground. In addition, an n-p-n type transistor 86 includes a collector 87 connected to the junction between inductor 84 and capacitor 85, a base 88 connected through a resistor 89 to ground and an emitter 90 connected through a resistor 91 to a terminal 92 maintained at a potential of the order of −6 volts relative to ground. A resistor 93 and a capacitor 94 are connected in parallel from terminal 92 to the base 88 of transistor 86.

A diode 96 is connected from the terminal 79 to the junction 26 and poled in a manner to prevent the potential appearing at junction 26 from going more negative than the potential maintained at terminal 79. Lastly, resistors 99, 100 are connected across the deflection yokes 10, 12, respectively, for damping the voltage transients developed thereacross.

In order to explain the operation of the device of the present invention, a step-voltage waveform 101 will be applied to the input terminal 54 of the paraphase amplifier 14 which, in turn, generates a step-down waveform 102 at the collector 47 of transistor 40 and a step-up waveform 103 similar to waveform 101 at the collector 48 of transistor 42. The step waveforms 102, 103 are applied to the bases 19, 20, respectively, whereby a decrease in potential at the base 19 causes the flow of current through transistor 17 to decrease and an increase in voltage at the base 20 causes the flow of current through transistor 18 to increase. The decrease in the flow of current through transistor 17 produces a correspondingly less negative voltage at the ungrounded extremity resistor 28, which positive-going excursion in voltage is fed back through feedback resistor 30 to the base 44 of transistor 42 thereby to counteract the current of voltage waveform 103. The increase in current through transistor 18, on the other hand, results in a greater voltage drop across the voltage dropping resistor 29. This negative-going excursion in voltage is fed back through the feedback resistor 31 to the base 43 of transistor 40 where it combines degeneratively with the waveform 101. Thus, the connections from deflection yoke windings 10, 12 through feedback resistors 30, 31 to the bases 44, 43, respectively, of transistors 42, 40 are degenerative in character.

Referring now to the voltage sensing device 36 the resistor 69 and the resistors 59, 60 and diodes 57, 58 form a voltage dividing network from the terminal 65 maintained at 15 volts relative to ground to the input side of the yoke windings 10, 12. When the input side of one of the yoke windings 12, as in the present case, experiences a negative-going excursion which exceeds the voltage drop across the resistor 59 and diode 57 connected to the remaining yoke winding, the junction 62 becomes negative relative to the input side of yoke 10, whereby substantially no current flows through the diode 57. Thus, junction 62 along with base 66 of transistor 63 follows the input side of deflection yoke 12 negative by substantially a constant amount equal to the voltage drop across the resistor 60 and the diode 58. The decrease in the potential of base 66 of transistor 63 produces a corresponding decrease in the potential of emitter 67 which lowers the constant voltage dropping network 68 which, in turn, lowers the potential at the output junction 70 of the emitter follower 37. The transistor 74 functions so as to provide current for the Zener diode 72 of the constant voltage network 68 and, in addition, provides an appropriate negative potential at the output junction 70 should this be required to enable the base 66 of transistor 63 to follow the negative excursion appearing at the input of deflection yoke winding 12. Thus, a voltage is developed at output junction 70 which is substantially constant relative to that developed at the output junction 62 of voltage sensing device 36. Also, during quiescent conditions the potential developed at output junction 70 is substantially constant relative to the potentials of the collectors 23, 24 of transistors 17, 18. This voltage available at output junction 70 is applied through resistors 34, 35 to the bases 19, 20 of transistors 17, 18 thereby to apply this substantially constant voltage drop across the transistor 17 or 18 which has the more negative voltage at the collector thereof. The current required by transistors 17 and 18 to generate the necessary current through deflection yoke windings 10 or 12 is provided by the large inductor 84 and capacitor 85, which current is replenished by the transistor 86. When the voltage at the output 70 of emitter follower 37 makes a negative excursion, an increased voltage drop is applied across the large inductor 84 thus causing additional current to flow. In order to avoid damage to the transistors 17, 18 by allowing too much current to flow therethrough, a diode 96 is connected from junction 26 to terminal 79 and poled in a manner to prevent junction 26 from experiencing excursions more negative than the potential appearing at terminal 79.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. An apparatus for magnetically deflecting the electron beam of a cathode-ray type tube, said apparatus comprising first and second deflection yoke windings each having first and second terminals, said second terminals thereof being returned to a common junction maintained at ground potential; first and second transistors of like conductivity types responsive to push-pull deflection signals and coupled to said first terminals of said first and second deflection yoke windings, respectively, for providing current flow therethrough; means connected to said first and second deflection yoke windings for generating a tracking voltage which follows the more negative voltage appearing on either of said windings by a predetermined amount and for applying said tracking voltage to said first and second transistors; and means connected to said first and second transistors for supplying a constant current thereto thereby to minimize energy dissipation therein.

2. The apparatus for magnetically deflecting the electron beam of a cathode-ray type tube as defined in claim 1 wherein said means for generating a tracking voltage which follows the more negative voltage appearing on either of said windings by a predetermined amount includes a constant voltage network constituting a capacitor and a Zener diode connected in parallel.

3. An apparatus for magnetically deflecting the electron beam of a cathode-ray type tube, said apparatus comprising first and second deflection yoke windings each having first and second terminals, said second terminals thereof being returned to a first junction maintained at ground potential; first and second n-p-n type transistors each having a base responsive to push-pull deflection signals, an emitter connected to a second junction and a collector connected to said first terminals of said first and second deflection yoke windings, respectively; means connected to said second junction for supplying a constant current thereto; means connected to said first terminals of said first and second deflection yoke windings for generating a tracking voltage which follows the more negative voltage appearing at either of said first terminals of said first and second deflection yoke windings and for applying said tracking voltage to said bases of said first and second transistors thereby to minimize energy dissipation therein.

4. An apparatus for magnetically deflecting the electron beam of a cathode-ray type tube, said apparatus comprising first and second deflection yoke windings each having first and second terminals, said second terminals thereof being returned to a first junction maintained at ground potential; first and second n-p-n type transistors each having a base responsive to push-pull deflection signals, an emitter connected to a second junction and a collector connected to said first terminals of said first and second deflection yoke windings, respectively; means connected to said second junction for supplying a constant current thereto; a third n-p-n type transistor having an emitter, a base and a collector, said collector being connected to a third junction maintained at a potential that is positive relative to said reference potential; a first resistor connected from said third junction to said base of said third transistor; a second resistor and a first diode serially connected from said base of said third transistor to said first terminal of said first deflection yoke winding and a third resistor and a second diode serially connected from said base of said third transistor to said first terminal of said second deflection yoke winding, said first and second diodes being poled to allow current flow away from said base of said third transistor; a first capacitor and a Zener diode connected in parallel from said emitter of said third transistor to a fourth junction; a fourth n-p-n type transistor having an emitter connected through a fourth resistor to a fifth junction maintained at a potential negative relative to said reference potential, a collector connected directly to said fourth junction and a base connected through a fifth resistor to said first junction and through a sixth resistor and a second capacitor in parallel to said fifth junction; and seventh and eighth resistors connected from said fourth junction to said bases of said first and second transistors, respectively.

5. The apparatus for magnetically deflecting the electron beam of a cathode-ray type tube as defined in claim 4 wherein said push-pull deflection signals are provided by a paraphase amplifier and which additionally includes first and second impedance elements interposed between said second terminals of said first and second deflection yoke windings, respectively, and said first junction; and means connected from said second terminals of said first and second deflection yoke winding to said paraphase amplifier for providing feedback thereto.

References Cited in the file of this patent

UNITED STATES PATENTS

| | | |
|---|---|---|
| 2,629,006 | Oliver | Feb. 17, 1953 |
| 2,762,870 | Sziklai et al. | Sept. 11, 1956 |
| 2,853,650 | Close | Sept. 23, 1958 |
| 2,964,673 | Stanley | Dec. 13, 1960 |